United States Patent [19]

Bertelo et al.

[11] Patent Number: 5,763,515
[45] Date of Patent: Jun. 9, 1998

[54] REINFORCING COMPOSITIONS INCLUDING A PRECIPITATED SILICA FOR THERMOPLASTIC POLYMERS WHICH IMPROVED ANTICAKING AND FLOW PROPERTIES

[75] Inventors: Chris Bertelo, Scotch Plains, N.J.; Paul Kunesch, Ousse; Gilles Meunier, Mazerolles, both of France

[73] Assignee: ELF Atochem North America Inc., Philadelphia, Pa.

[21] Appl. No.: 539,634

[22] Filed: Oct. 5, 1995

[30] Foreign Application Priority Data

Oct. 5, 1994 [FR] France .................... 94 11898

[51] Int. Cl.⁶ .................. C08K 3/36; C08L 33/00
[52] U.S. Cl. .......... 524/493; 524/563; 524/560; 523/216; 423/339
[58] Field of Search .................. 524/493, 563, 524/560, 527; 423/339; 523/216

[56] References Cited

U.S. PATENT DOCUMENTS

| | | | |
|---|---|---|---|
| 3,873,489 | 3/1975 | Thurn et al. | 260/448.2 |
| 4,179,421 | 12/1979 | Edwards et al. | 260/23.7 |
| 4,519,430 | 5/1985 | Ahmad | 152/209 R |
| 4,792,487 | 12/1988 | Schubring et al. | 524/493 |
| 4,810,305 | 3/1989 | Braun et al. | 106/499 |
| 4,956,398 | 9/1990 | Ayub et al. | 523/209 |
| 5,227,425 | 7/1993 | Rauline | 524/493 |
| 5,405,908 | 4/1995 | Takahashi et al. | 524/493 |
| 5,412,018 | 5/1995 | Krivak et al. | 524/493 |
| 5,447,971 | 9/1995 | Bergh et al. | 524/493 |
| 5,470,905 | 11/1995 | Meier et al. | 524/493 |

Primary Examiner—Joseph L. Schofer
Assistant Examiner—Olga Asinovsky
Attorney, Agent, or Firm—Millen, White, Zelano, & Branigan, P.C.

[57] ABSTRACT

The invention relates to reinforcing compositions for thermoplastic polymers which have improved anticaking and flow properties, which include an impact additive and a precipitated silica.

These compositions are very particularly suitable for the reinforcement of PVC.

28 Claims, 1 Drawing Sheet

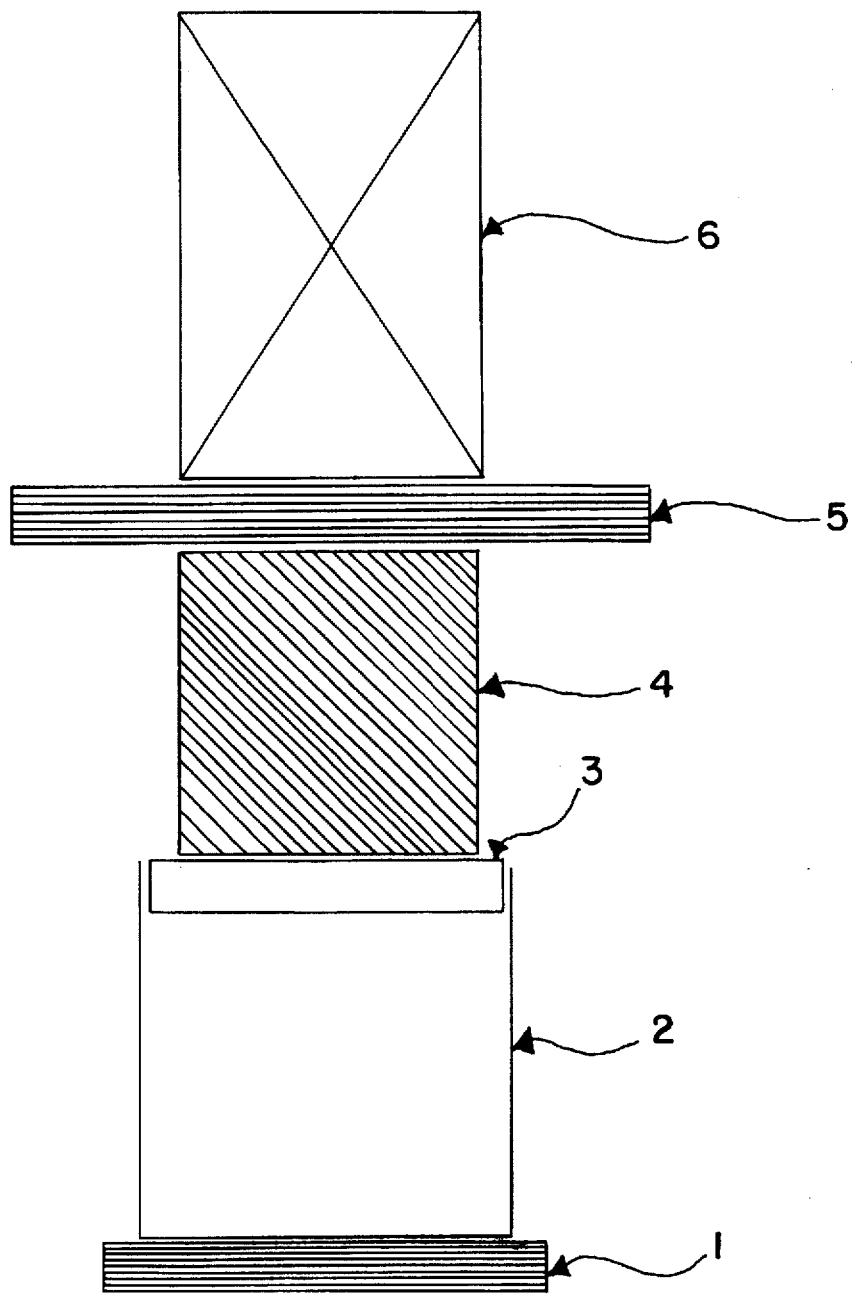

ic polymer# REINFORCING COMPOSITIONS INCLUDING A PRECIPITATED SILICA FOR THERMOPLASTIC POLYMERS WHICH IMPROVED ANTICAKING AND FLOW PROPERTIES

CROSS-REFERENCE TO RELATED APPLICATION

This application is related to a concurrently filed application entitled "REINFORCING COMPOSITIONS FOR THERMOPLASTIC POLYMERS, INCLUDING A SYNERGIC COMBINATION OF MICRONIZED SILICA AND OF CALCIUM SALT WHICH HAVE IMPROVED ANTICAKING AND FLOW PROPERTIES", Attorney's Docket No. ATOCM 52, by the same inventors, based on French priority application Serial No. 94/11897.

BACKGROUND OF THE INVENTION

The invention relates to a reinforcing composition for thermoplastic polymers which have improved anticaking and flow properties, including at least one precipitated silica.

The invention relates especially to a reinforcing composition for vinyl chloride polymers, it being possible for the said composition to include a copolymer derived from butadiene and/or from an acrylic ester and a precipitated silica.

Some synthetic resins, especially resins based on polyvinyl chloride or on copolymers with a predominant content of vinyl chloride are widely employed in the building industry, especially because of their low price and of their good physical and/or chemical properties.

Nevertheless, they exhibit low impact strength at ambient temperature or at low temperature or, equally, after aging.

It has been proposed to overcome these defects by incorporating into these thermoplastic resins products known as impact additives, which are generally polymers exhibiting some elastomeric nature.

The weight quantity of elastomer in these impact additives may vary to a wide extent. It generally ranges from 40 to 70%. However, if it is desired to increase this weight content of elastomer in the impact additive, in order thereby to increase its effectiveness, a considerable caking is found when the said additive is isolated in the form of powder and, equally, during storage.

This results in difficulties in handling and rules out conveying the additives pneumatically.

In U.S. Pat. No. 3,985,703 there is a description of a process which makes it possible to obtain core/shell acrylic polymer powders which have elastomeric portion contents ranging from 55 to 85%, which have improved flow and anticaking properties.

This process consists in adding 0.01 to 1.5% of inert particles of micronized silica with a particle diameter of 0.012 microns, especially at the time of the spray-drying of the said powders.

SUMMARY OF THE INVENTION

A reinforcing composition for a thermoplastic polymer has now been found, including at least one impact additive, which has improved anticaking and flowability properties, characterized in that it additionally includes a precipitated silica.

According to the present invention a precipitated silica is intended to mean a silica consisting of primary particles of the order of 10 to 60 nanometers, which associate to form agglomerates that have mean sizes ranging from 3 to 100 microns.

Precipitated silicas which have agglomerates that have mean sizes ranging from 3 to 80 microns and, preferably, from 5 to 60 microns and more preferably 5 to 15 microns are preferably employed.

The $SiO_2$ content, determined in relation to the substance calcined for 2 hours at 1000° C. is higher than 98%.

According to the present invention precipitated silicas which have a specific surface (BET) ranging from 25 to 700 $m^2/g$ and, preferably, ranging from 50 to 500 $m^2/g$ are employed.

According to the present invention, both hydrophobic and hydrophilic precipitated silicas are employed.

The preparation of such precipitated silicas is described in the literature and does not form the subject-matter of the invention.

By way of illustration of the impact additives that can be employed according to the present invention there may be mentioned especially the graft copolymers derived from a conjugated diene such as butadiene or isoprene, which are chosen from butadiene-styrene thermoplastic resins such as the acrylonitrile-butadiene-styrene resins (ABS resins), methacrylic alkyl ester-butadiene-styrene resins (MBS resins) and acrylic and/or methacrylic alkyl ester-butadiene-styrene resins. Among the methacrylic alkyl ester resins there may be mentioned in particular the methyl methacrylate-butadiene-styrene resins, the ethyl methacrylate-butadiene-styrene resins, the butyl methacrylate-butadiene-styrene resins and the lauryl methacrylate-butadiene-styrene resins. With regard to the acrylic alkyl ester-butadiene-styrene resins there may be mentioned those derived from methyl, ethyl, butyl or 2-ethylhexyl acrylates. It is also possible to mention graft copolymers including a backbone consisting of a random copolymer of a conjugated diene and of a $C_2$–$C_{12}$ alkyl acrylate, onto which are grafted chains of a copolymer of $C_1$–$C_4$ alkyl methacrylate and of $C_1$–$C_8$ alkyl acrylate, it being additionally possible for the backbone copolymer to contain units derived from a crosslinking agent containing at least two $CH_2$=C< groups, the said copolymers having been described, for example, in French Patents 2,556,446 and 2,551,447, the content of which is incorporated by reference.

It is also possible to employ resins derived from butadiene which are thermoplastic during the processing and before vulcanization, such as styrene-butadiene rubber (SBR), nitrile-butadiene rubber (NBR) and acrylate-butadiene rubber (ABR).

Among these polymers derived from butadiene preference is given to the MBS and ABS resins.

It is also possible to employ essentially acrylic resins, that is to say those containing more than 90% by weight of polymerized acrylic ester.

According to the present invention the elastomer content in the polymeric impact additive is at least 60% by weight and, preferably, between 70% and 90%.

The reinforcing composition according to the present invention includes at least 80% by weight of impact additive and, preferably, from 95% to 99%, and not more than 20% by weight of precipitated silica and, preferably, 1% to 5%.

The thermoplastic polymer in which the precipitated silica in accordance with the invention may be incorporated with a view to improving its impact strength may consist especially of polymer of the polycondensate type, especially polyesters such as polybutylene terephthalate, polycarbonates, polyamides, or else of the type of polymers such as, for example, polymethacrylates and especially polymethyl methacrylate. The thermoplastic polymer may also consist of one or more addition polymers chosen from the group made up of vinyl chloride homopolymers which may be optionally overchlorinated and the copolymers which result from the copolymerization of the vinyl chloride with one or more ethylenically unsaturated comonomers and which contain at least 80% by weight of polymerized vinyl chloride. Comonomers which are especially suitable for the preparation of such copolymers are vinylidene halides such as vinylidene chloride or fluoride, vinyl carboxylates such as vinyl acetate, vinyl propionate and vinyl butyrate, acrylic and methacrylic acids and the nitriles, amides and alkyl esters derived therefrom, especially acrylonitrile, acrylamide, methacrylamide, methyl methacrylate, methyl acrylate, butyl acrylate, ethyl acrylate and 2-ethylhexyl acrylate, vinylaromatic derivatives such as styrene and vinylnaphthalene and olefins such as bicyclo[2.2.1]-2-heptene, bicyclo[2.2.1]hepta-2,5-diene, ethylene, propene and 1-butene.

Among these polymers, the invention is concerned very particularly with vinyl chloride homo- and copolymers.

The reinforcing composition of the present invention is employed in a proportion of 1 to 15 parts per 100 parts by weight of thermoplastic polymer and, preferably, from 4 to 9 parts.

The invention is also concerned with the compositions including the thermoplastic polymer and the reinforcing composition such as those defined above.

It is also concerned with such compositions which additionally contain, and especially as a function of the processing or conversion conditions and/or of the applications for which they are destined, the usual additives such as pigments and/or fillers, plasticizers, antioxidants and light- or ultraviolet stabilizers.

By way of illustration of these additives it is possible to mention β-diketones, hydrotalcites, dihydropyridines, carboxylic acid salts of metals such as Li, Na, K, Mg, Ca, Sr, Ba, Pb, Zn, Cd, Zr, Al, Si, Sb or Bi or pairs of these metals, such as Ca/Zn, Ba/Ca, Ca/Cd or Ba/Zn, mercaptides and especially tin mercaptides, alkyl or aryl phosphites, epoxy compounds, polyols, internal or external lubricants, such as ester waxes, fatty acid esters, oxidized or unoxidized polyethylene waxes, hydrogenated castor oil, glycerol monooleate or stearate, montanic acid esters and fillers such as titanium dioxide or calcium carbonate.

Except for the plasticizers, which may in general be employed in ratios that can reach 100% of the weight of the thermoplastic polymer, the other abovementioned additives may be employed in ratios that may represent 0.05 to 20% by weight of the thermoplastic polymer.

The reinforcing composition according to the present invention may be prepared merely by dry-mixing of the constituents of the composition in an apparatus which ensures a good dispersion of powders of small particle size. Cloup type mixers rotating at a speed of at least 5000 rev/min and, preferably, between 7000 and 10,000 rev/min may be employed for this purpose.

The impact additive and the precipitated silica may be incorporated into the thermoplastic polymer as a mixture (reinforcing composition) or as they are, before, at the same time as or after the other additives referred to above when they are being used.

The precipitated silica may also be introduced at the time of the drying of the impact additive, which may be carried out especially by spraying. The examples which follow illustrate the invention.

BRIEF DESCRIPTION OF DRAWING

The attached drawing is a schematic elevation of a device used to test the caking characteristics of the products of the invention.

Preparation of the reinforcing compositions according to the invention.

The compositions were prepared with the following constituents:

Impact additive

The impact additive of the core/shell type (80/20) is prepared according to the technique described in U.S. Pat. No. 4,278,576, which employs a standard emulsion polymerization technique, namely the core/shell acrylic polymer is prepared by employing 79.2 parts of butyl acrylate, 0.4 parts of butylene glycol diacrylate and 0.4 parts of diallyl maleate as elastomeric core, followed by a polymerization of 20 parts of methyl methacrylate.

The powder is obtained from the emulsion by spray drying.

The water content of the additive is 1%.

Precipitated silicas

S1. Precipitated silica marketed by the Omnia company under the name Neosil GP.

S2. Precipitated silica marketed by the Degussa company under the name FK 500 LS.

S3. Precipitated silica marketed by the Degussa company under the name FK 320 DS.

S4. Precipitated silica marketed by the Degussa company under the name Sipernat D 17.

S5. Precipitated silica marketed by the Degussa company under the name Sipernat D 10.

We have reported in Table 1 below the essential characteristics of the precipitated silicas employed.

TABLE 1

| Characteristics | Precipitated silica | | | | |
|---|---|---|---|---|---|
| | S1 | S2 | S3 | S4 | S5 |
| Average size of the agglomerates (in microns) | 11 | 3.5 | 4 | 10 | 5 |
| BET surface (in m²/g) | 200 | 450 | 170 | 100 | 90 |
| hydrophobic | | | | + | + |
| hydrophilic | + | + | + | | |

The reinforcing compositions are produced by dry-mixing the various constituents at ambient temperature in a mixer of the "Cloup" type rotating at 7000 rev/min.

The following are performed on the mixture obtained:
the caking test
the test for the ability to flow, referred to below as flowability.

Caking test

This is performed with a device such as shown in the single FIGURE.

A hollow cylinder (2) 50 mm in height and with an internal diameter of 55 mm is deposited on a 60×60 mm PVC plaque (1) of 7 mm thickness.

20 g of powder are introduced into the cylinder (2), the surface is flattened and a disc (3) 55 mm in diameter and 10 mm in thickness is applied. A solid PVC cylinder (4) 50 mm in diameter and 40 mm in height is applied onto this disc, followed by an 85×85 mm plaque (5) 6 mm in thickness.

The whole is introduced into an oven at 45° C. and a 5-kg weight (6) is deposited on the plaque (5).

These are held at 45° C. for 2 hours.

After 2 hours the 5-kg weight, the plaque (5) and the solid cylinder (4) are removed.

The material is again kept for 30 minutes in the oven at 45° C. and the compacted powder sample is allowed to cool to ambient temperature for 30 minutes.

The powder in the form of a compacted tablet is introduced into a 12-mesh screen (mesh opening=1.40 mm) of a Prolabo type screening unit which is set in vibration (setting 5.5).

The remaining weight is recorded every 5 seconds and so is the time after which 60% of the product has passed through.

The results are expressed in seconds:

the longer the time for 60% of the product to pass through, the greater the caking.

The test for the ability to flow or flowability is performed according to ISO International Standard 6186-1980 (F).

The results are expressed in seconds. The longer the time, the poorer the ability to flow.

The results of the tests for caking and for ability to flow performed on the reinforcing compositions based on impact additive A1 and on precipitated silica are reported in Table 2.

In this table the proportions of the constituents in the reinforcing composition are expressed as percentage by weight.

TABLE 2

| EXAMPLES | IMPACT ADDITIVES (%) | PRECIPITATED SILICA (%) | | | | | CAKING (seconds) | FLOW-ABILITY (seconds) |
|---|---|---|---|---|---|---|---|---|
| | | S1 | S2 | S3 | S4 | S5 | | |
| 1 (control) | 100 | | | | | | 80 | does not flow |
| 2 | 99 | 1 | | | | | 15 | 11 F |
| 3 | 98 | 2 | | | | | 5 | 14.5 F |
| 4 | 99 | | 1 | | | | 8 | 12.5 F |
| 5 | 99 | | | 1 | | | 5 | 10.5 F |
| 6 | 99 | | | | 1 | | 9 | 10 F |
| 7 | 99 | | | | | 1 | 13 | 10 F |

F = flows

Evaluation of the impact strength of the compositions according to the invention A composition containing the following (parts by weight) is prepared at 25° C.:

100 parts of a vinyl chloride homopolymer of K value=67,
2.5 parts of lead phosphite,
1.5 parts of calcium stearate,
6 parts of calcium carbonate,
4 parts of TiO$_2$,
1 part of a processing aid (Metablen P550, marketed by the company Metablen B.V.),
0.2 parts 12 stearic acid,
0.3 parts of Loxiol G60 (internal lubricant),
4 parts of polyethylene waxes (external lubricant) and 6 parts of the reinforcing composition of Example 1 not in accordance with the invention [→ Example 8, Table 3] or 9 parts of the reinforcing composition of Example 2 in accordance with the invention [→ Example 9, Table 3].

Test pieces are produced from the PVC compositions obtained previously in order to perform the tests for determining the notched Charpy impact strength characteristics according to standard BS:2782.

In order to prepare the test pieces for the Charpy impact tests, the PVC resin compositions resulting from the mixtures of the abovementioned ingredients are calendered at 175° C. for 6 minutes on a calender of the Schwanbenthan type and then moulded at 190° C. on a Derragon press, for 5 minutes at a pressure of 200 bars, in the form of plaques, the cooling of the said plaques taking place in the press.

The test pieces are cut out by means of a circular saw and then of a cutter for the Charpy impact tests.

The thickness of the test pieces, the shape of which is that specified by the abovementioned standard, is 2.5 mm.

The results are reported in Table 3.

TABLE 3

| EXAMPLES | Break energy (in kJ/m$^2$) | % BREAKAGE |
|---|---|---|
| 8 (control) | 16.6 | 0 |
| 9 | 15.5 | 0 |

It may be concluded that the impact strength of the PVC composition is virtually unmodified by the addition of precipitated silica (Example 9).

The preceding examples can be repeated with similar success by substituting the generically or specifically described reactants and/or operating conditions of this invention for those used in the preceding examples.

The entire disclosures of all applications, patents and publications, cited above and below, and of corresponding French application 94/11898, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. A reinforcing composition suitable for a thermoplastic polymer, comprising at least 80% by weight of at least one impact additive, and a precipitated silica made up of agglomerates which have average sizes ranging from 3 to 80 microns.

2. A composition according to claim 1, wherein the precipitated silica has agglomerates which have average sizes ranging from 5 to 15 microns.

3. A composition according to claim 2, wherein the precipitated silica has a specific surface ranging from 25 to 700 m$^2$/g.

4. A composition according to claim 2, wherein the precipitated silica has a specific surface ranging from 50 to 500 m$^2$/g.

5. A composition according to claim 1, wherein the impact additive means is an acrylic resin containing more than 90% by weight of polymerized acrylic ester.

6. A composition according to claim 1 comprising at least 80% by weight of impact additive means and not more than 20% by weight of precipitated silica.

7. A composition according to claim 4, comprising from 95% to 99% by weight of impact additive and from 1% to 5% by weight of precipitated silica.

8. A thermoplastic polymer composition containing a reinforcing composition according to claim 1.

9. A thermoplastic polymer composition according to claim 8 in which the thermoplastic polymer is a vinyl chloride homo- or copolymer.

10. A composition according to claim 7, wherein the impact additive is an acrylic resin containing more than 90% by weight of polymerized acrylic ester.

11. A thermoplastic polymer composition containing a reinforcing composition according to claim 2.

12. A thermoplastic polymer composition containing a reinforcing composition according to claim 3.

13. A thermoplastic polymer composition containing a reinforcing composition according to claim 4.

14. A thermoplastic polymer composition containing a reinforcing composition according to claim 5.

15. A thermoplastic polymer composition containing a reinforcing composition according to claim 6.

16. A thermoplastic polymer composition containing a reinforcing composition according to claim 7.

17. A thermoplastic polymer composition according to claim 11 in which the thermoplastic polymer is a vinyl chloride homo- or copolymer.

18. A thermoplastic polymer composition according to claim 14 in which the thermoplastic polymer is a vinyl chloride homo- or copolymer.

19. A thermoplastic polymer composition according to claim 15 in which the thermoplastic polymer is a vinyl chloride homo- or copolymer.

20. A thermoplastic polymer composition according to claim 16 in which the thermoplastic polymer is a vinyl chloride homo- or copolymer.

21. A thermoplastic polymer composition according to claim 8, in which the thermoplastic polymer is a polyester, a polycarbonate, a polyamide, or a polymethacrylate.

22. A thermoplastic polymer composition according to claim 21, in which the thermoplastic polymer is polybutyleneterephthalate, or polymethylmethacrylate.

23. A thermoplastic polymer composition according to claim 30, wherein the thermoplastic polymer is a copolymer produced from the copolymerization of vinyl chloride and vinylidene chloride, vinylidene fluoride, vinyl acetate, vinyl propionate, vinyl butyrate, acrylonitrile, acrylamide, methacrylamide, methylmethacrylate, methyl acrylate, butyl acrylate, ethyl acrylate, 2-ethylhexyl acrylate, styrene, vinylnaphthalene, bicyclo[2.2.1]-2-heptene, bicyclo[2.2.1] hepta-2,5-diene, ethylene, propene or 1-butene.

24. A reinforcing composition suitable for a thermoplastic polymer, comprising at least 80% by weight of at least one impact additive, and a silica material consisting of a precipitated silica made up of agglomerates which have average sizes ranging from 3 to 80 microns.

25. A thermoplastic polymer composition containing a reinforcing composition according to claim 24.

26. A reinforcing composition according to claim 1, wherein the impact additive is a butadiene-styrene resin.

27. A thermoplastic composition according to claim 8, wherein the thermoplastic polymer is a vinyl chloride homopolymer or a copolymer of vinyl chloride and an ethylenically unsaturated comonomer.

28. A thermoplastic composition according to claim 8, wherein the thermoplastic polymer is a copolymer of vinyl chloride and a vinylidene halide, a vinyl carboxylate, a vinyl aromatic compound, an olefin or an acrylic or methacrylic acid, alkyl ester, nitrile, or amide.

* * * * *